(12) United States Patent
Kempa et al.

(10) Patent No.: US 10,999,448 B2
(45) Date of Patent: May 4, 2021

(54) DISPLAYING A SCANNED IMAGE OF A PHYSICAL NOTE

(71) Applicant: International Business Machines Corporation, Armonk, NY (US)

(72) Inventors: Matthew J. Kempa, Congleton (GB); Syed Akhass Adnan Wasti, Cambridge (GB); Hisham Jafar Ali, Nottingham (GB); Giacomo G. Chiarella, Winchester (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/665,126

(22) Filed: Oct. 28, 2019

(65) Prior Publication Data
US 2020/0059563 A1 Feb. 20, 2020

Related U.S. Application Data

(63) Continuation of application No. 15/944,932, filed on Apr. 4, 2018.

(51) Int. Cl.
*H04N 1/00* (2006.01)
*H04N 1/10* (2006.01)
*G06F 3/0481* (2013.01)

(52) U.S. Cl.
CPC ..... *H04N 1/00018* (2013.01); *H04N 1/00034* (2013.01); *H04N 1/00082* (2013.01); *H04N 1/00392* (2013.01); *H04N 1/1061* (2013.01); *G06F 3/04812* (2013.01)

(58) Field of Classification Search
CPC .................................................. H04N 1/00018
USPC .......................................................... 358/538
See application file for complete search history.

(56) References Cited

U.S. PATENT DOCUMENTS

| | | | |
|---|---|---|---|
| 8,532,675 B1* | 9/2013 | Pasquero | H04M 1/72572 455/456.3 |
| 9,195,697 B2 | 11/2015 | Black et al. | |
| 2006/0001914 A1 | 1/2006 | Mesmer et al. | |
| 2008/0136833 A1* | 6/2008 | Taniguchi | G09G 5/24 345/581 |
| 2011/0029855 A1* | 2/2011 | Morita | G06F 3/03545 715/233 |

(Continued)

OTHER PUBLICATIONS

Saoji et al., "Digital Pen: How written document convert into Digital form", International Journal of Engineering Trends and Technology (IJETT), vol. 36, No. 4, Jun. 2016, pp. 180-183.

(Continued)

*Primary Examiner* — Jacky X Zheng
(74) *Attorney, Agent, or Firm* — William H. Hartwell; Hunter E. Webb; Keohane & D'Alessandro, PLLC

(57) ABSTRACT

Approaches presented herein enable transferring a physical note to an electronic medium. The approach includes scanning, as an image, a physical note positioned on a display screen of an electronic device and automatically inserting the scanned image into an application being used on the electronic device. A physical note is positioned on a display screen of an electronic device by a user. The physical note is scanned as an image and a location of the physical note is logged. A target application is determined based on the location of the physical note and the scanned image is automatically inserted into the application.

20 Claims, 7 Drawing Sheets

(56) References Cited

U.S. PATENT DOCUMENTS

| | | |
|---|---|---|
| 2011/0057866 A1 | 3/2011 | Konicek |
| 2014/0297646 A1 | 10/2014 | Bastiaens et al. |
| 2015/0106754 A1 | 4/2015 | Somasundaram et al. |
| 2016/0110025 A1 | 4/2016 | Hossu |
| 2017/0220145 A1 | 8/2017 | Ludwig |
| 2017/0269821 A1* | 9/2017 | Kano .................. G06F 3/04845 |

OTHER PUBLICATIONS

Back et al., "Prototyping a tangible tool for design: Multimedia e-paper sticky notes", Artificial Intelligence for Engineering Design, Analysis and Manufacturing (2009), pp. 263-274.

Sarah Perez, "Post-it Notes Get Digitized in a Clever New App from 3M", https://techcrunch.com/2014/09/26/post-it-notes-get-digitized-in-a-clever-new-app-from-3m/, Sep. 26, 2014, 6 pages.

Ubergizmo, "Scanner concept uses Oled", http://www.ubergizmo.com/2009/12/scanner-concept-uses-oled/, Dec. 2009, 2 pages.

Engadget, "Vivo beats Apple to an under-display fingerprint scanner", https://www.engadget.com/2017/06/28/vivo-qualcomm-under-display-fingerprint-reader/, Copyright 2018 AOL (UK), 11 pages.

Gizmodo, "Radical New Image Sensor Turns your Entire Display Into a Digital Camera", http://gizmodo.com/5986221/radical-new-image-sensor-turns-your-entire-display-into-a-digital-camera, Feb. 22, 2013, 4 pages.

Techgadgets.In, "Sharp Ultra-sensitive Touchscreen LCD with Photo Sensor in each Pixel", http://www.techgadgets.in/displays/2007/01/sharp-ultra-sensitive-touchscreen-lcd-with-photo-sensor-in-each-pixel/, Jan. 2007, 1 page.

Zheng, Jacky X., U.S. Appl. No. 15/944,932, Office Action dated Mar. 5, 2019, 22 pgs.

Zheng, Jacky X., U.S. Appl. 15/944,932, Final Office Action dated Jul. 17, 2019, 24 pgs.

Zheng, Jacky X., U.S. Appl. No. 15/944,932, Notice of Allowance dated Sep. 25, 2019, 10 pgs.

Appendix P, "List of IBM Patents or Patent Applications Treated as Related", Mar. 25, 2020, 2 pages.

* cited by examiner

DISPLAYING A SCANNED IMAGE OF A PHYSICAL NOTE

The present patent document is a continuation of U.S. patent application Ser. No. 15/944,932, filed Apr. 4, 2018, entitled "DISPLAYING A SCANNED IMAGE OF A PHYSICAL NOTE", the disclosure of which is incorporated herein by reference.

TECHNICAL FIELD

The subject matter of this invention relates generally to image processing. More specifically, aspects of the present invention provide a solution for transferring a physical note to an electronic medium.

BACKGROUND

Physical notes including sticky-back notes, such as Post-it® notes, are popularly used for a wide variety of purposes. Sticky-back notes appear on walls and billboards, cluster around computer monitor frames, and are embedded within documents. They can be used for gathering informal feedback and annotating discussions, for personal notes, asynchronous discussion among groups or between persons, and for error correction. Posterboards covered with many colors of sticky-back notes can be used to document tasks as diverse as brainstorming sessions, project planning, and design presentations. Studies on work process for many kinds of designers show that sticky-back notes are ubiquitous. Architects and product designers scribble notes and stick them onto blueprints or even onto physical models. New media or product designers can use them to represent nonlinear or sequential content units, enjoying the ease with which events can be rearranged in a storyboard, for example. The ease of use of sticky-back notes is one of their principal advantages. However, the ability to save, track, and search the information on sticky-back and other types of physical notes (e.g., on paper) can be unwieldy. A person may resort to camera capture of whiteboards or poster boards covered with physical notes, or to post-session computer entry by hand in order to save the information contained within the notes.

SUMMARY

In general, embodiments of the present invention enable scanning, as an image, a physical note positioned on a display screen of an electronic device and automatically inserting the scanned image into an application being used on the electronic device. A physical note is positioned on a display screen of an electronic device by a user. The physical note is scanned as an image and a location of the physical note is logged. A target application is determined based on the location of the physical note and the scanned image is automatically inserted into the application.

One aspect of the present invention includes a method for transferring a physical note to an electronic medium, the method comprising: scanning, as an image, a physical note positioned on a display screen; logging, relative to the display screen, a location of the physical note; identifying, based on the logged location, a target application to insert the scanned image; and automatically inserting the scanned image into the target application.

Another aspect of the present invention includes a computer program product embodied in a computer readable medium that, when executed by a computer device, performs a method for transferring a physical note to an electronic medium, the method comprising: scanning, as an image, a physical note positioned on a display screen; logging, relative to the display screen, a location of the physical note; identifying, based on the logged location, a target application to insert the scanned image; and automatically inserting the scanned image into the target application.

Yet another aspect of the present invention includes system for transferring a physical note to an electronic medium, comprising: a display screen having a plurality of pixels, each of the plurality of pixels having a photodiode and a screen light-emitting diode; a memory medium comprising instructions; a bus coupled to the memory medium; and a processor coupled to the bus that when executing the instructions causes the system to perform a method, comprising: scanning, with the plurality of pixels as an image, a physical note positioned on the display screen; logging, relative to the display screen, a location of the physical note; identifying, based on the logged location, a target application to insert the scanned image; and automatically inserting the scanned image into the target application.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
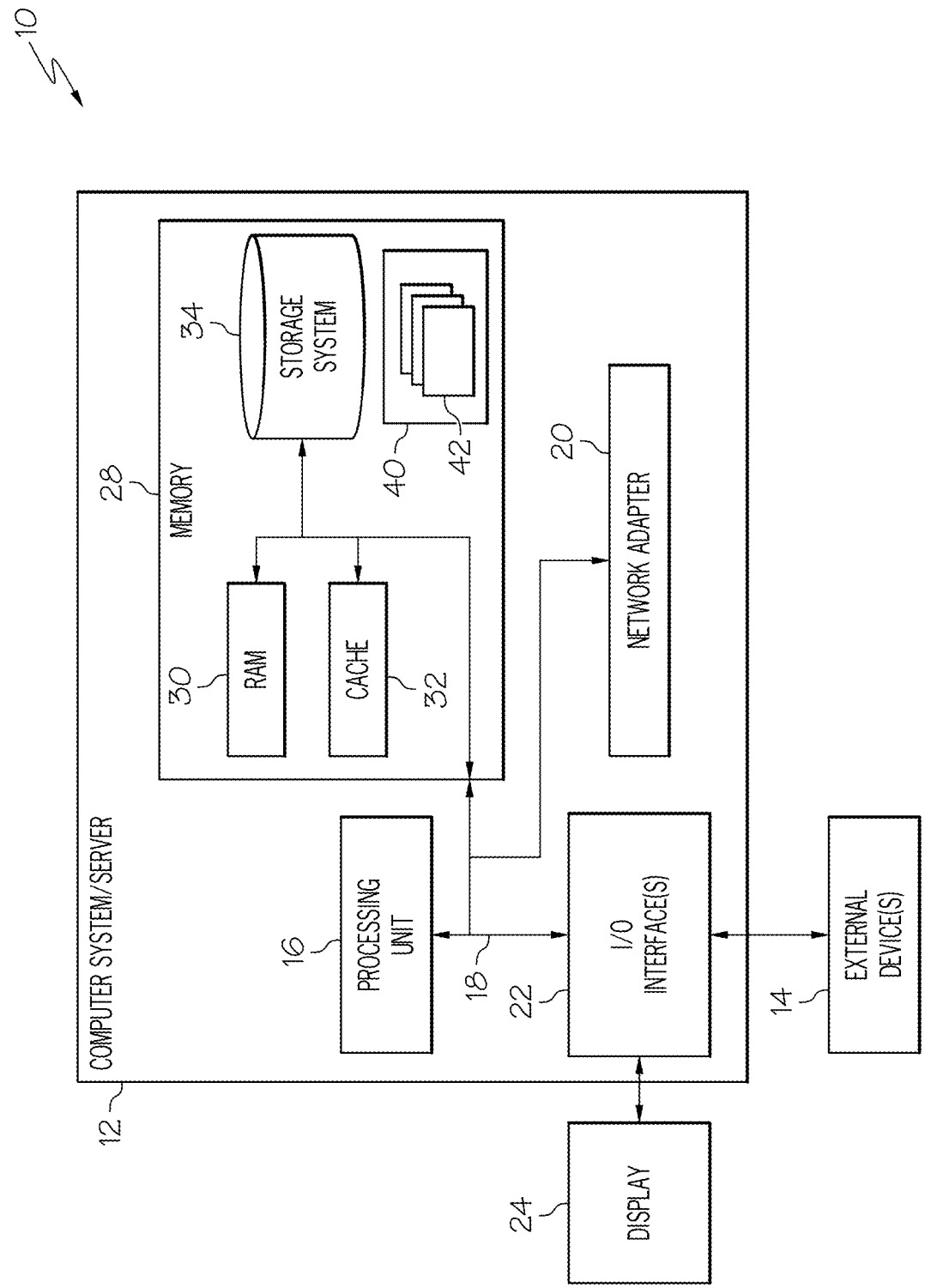
FIG. 1 shows an architecture 10 in which the invention may be implemented according to an illustrative embodiment of the present invention.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing", "detecting", "determining", "evaluating", "receiving", or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context. As used herein, the terms "user" and "consumer" are used interchangeably and refer to an individual who has opted in to receiving local inventory notifications.

As stated above, embodiments of the present invention enable scanning, as an image, a physical note positioned on a display screen of an electronic device and automatically inserting the scanned image into an application being used on the electronic device. A physical note is positioned on a display screen of an electronic device by a user. The physical note is scanned as an image and a location of the physical note is logged. A target application is determined based on the location of the physical note and the scanned image is automatically inserted into the application.

For different reasons, taking notes can be an important part of both a person's personal and professional life. For example, when reading or listening, taking notes can help a person concentrate. In order to take useful notes (e.g., to write something sensible), a person must understand the text. As listening and reading are interactive tasks, taking notes can help one make sense of the text. Taking notes does not mean writing down every word you hear. It requires actively deciding what is important and how it is related to what has already been written in the notes. Also, notes can help a person maintain a permanent record of what has been read or listened to. This can be useful when a need arises to refer to the notes in the future, such as when studying for an upcoming exam in school or having important information on hand for a business meeting or project.

While writing things out by hand has been shown to help with retention, it can be difficult to keep notes organized. The easiest way for a person to keep her notes organized is to keep them in one place. However, this can develop into a person keeping a random pile of sticky notes or scraps of paper on a desk which may fall off the desk and become lost. To avoid losing them, one can transfer them to a device such as a computer by either manually typing them into the device using a word processing application or by scanning them onto the device using a scanner, taking a photo of the notes using a camera and transmitting the photo to the device. Each of these methods, however, are inefficient and time-consuming.

In addition, sharing of physical notes can be problematic, such as during a conference call which necessitates the notes being transferred to a device. As mentioned, the transfer of physical notes to a device (e.g., via manual input, scanner, camera, etc.) can be slow and tedious. The approaches described herein provide a seamless way for scanning, as an image, a physical note positioned on a display screen of an electronic device and automatically inserting the scanned image into an application being used on the electronic device.

In certain embodiments, an advantage of this approach is its improvement of note-taking by allowing a person to more easily capture, organize, and share notes. This approach allows handwritten notes to be transitioned seamlessly to digital content without requiring manual input or the use of an external device (e.g., a scanner or camera), thereby reducing overhead and inefficiencies in producing organized notes which can be easily accessed and searched. This approach combines the advantages of handwriting and digital note-taking while erasing many of their respective drawbacks.

Referring now to FIG. 1, a computerized implementation 10 of an embodiment for scanning, as an image, a physical note positioned on a display screen of an electronic device and automatically inserting the scanned image into an application being used on the electronic device will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for scanning, as an image, a physical note positioned on a display screen of an electronic device and automatically inserting the scanned image into an application being used on the electronic device. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for scanning, as an image, a physical note positioned on a display screen of an electronic device and automatically inserting the scanned image into an application being used on the electronic device, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
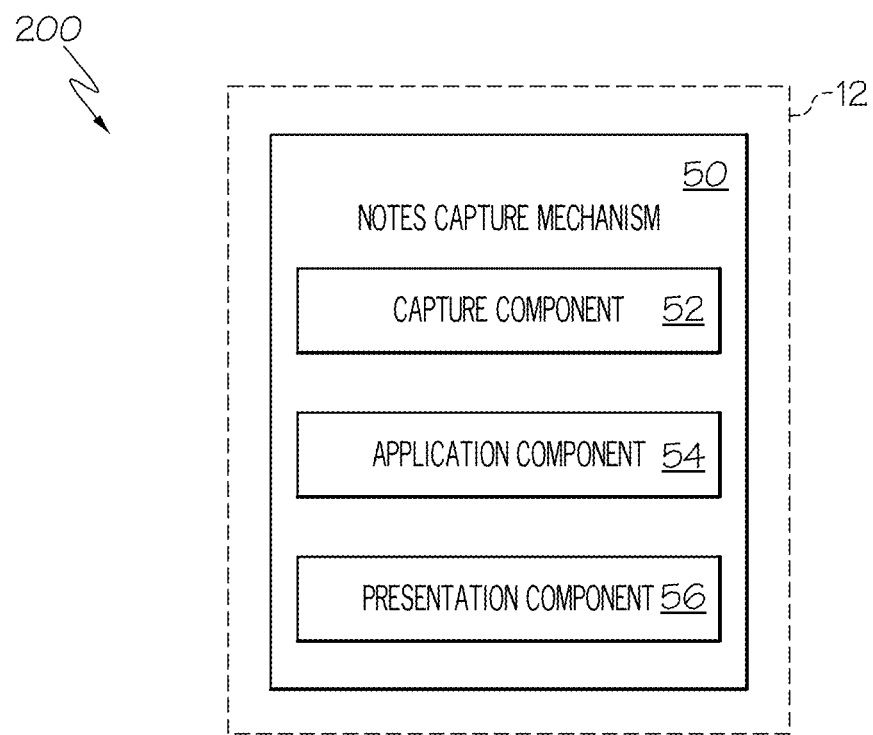
FIG. 2 shows a first schematic diagram 200 illustrating an exemplary environment for implementation according to an illustrative embodiment of the present invention.

Referring now to FIG. 2, a block diagram 200 describing the functionality discussed herein according to an embodiment of the present invention is shown. It is understood that the teachings recited herein may be practiced within any type of computing environment (e.g., computer system 12). To this extent, the teachings recited herein may be practiced within a stand-alone computer system or within a networked computing environment (e.g., a client-server environment, peer-to-peer environment, distributed computing environment, cloud computing environment, and/or the like). If the teachings recited herein are practiced within a networked computing environment, each electronic device need not have a notes capture mechanism 50 (hereinafter "system 50"). Rather, system 50 could be loaded on a server or server-capable device that communicates (e.g., wirelessly) with the electronic device for scanning, as an image, a physical note positioned on a display screen of an electronic device and automatically inserting the scanned image into an application being used on the electronic device. In a typical embodiment, however, system 50 or components of system 50 may reside within a screen connected to an electronic device capable of performing the functions described herein.

Regardless, as depicted, system 50 can be implemented as program/utility 40 on computer system 12 of FIG. 1 and can enable the functions recited herein. It is further understood that system 50 can be incorporated within or work in conjunction with any type of system that receives, processes, and/or executes commands with respect to IT resources in a networked computing environment. Such other system(s) have not been shown in FIG. 2 for brevity purposes. As shown, notes capture mechanism 50 includes capture component 52, application component 54, and presentation component 56. The functions/acts of each component is described in detail below.

Figure 3:
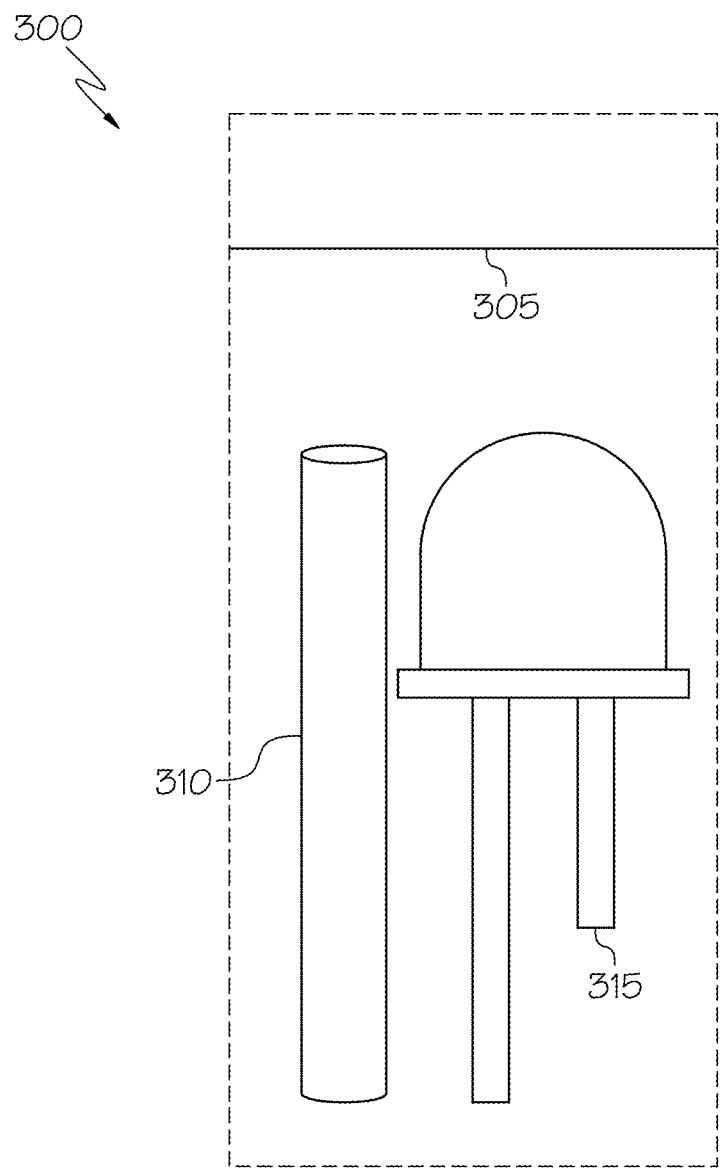
FIG. 3 shows an example pixel 300 of a display screen according to an illustrative embodiment of the present invention.

Capture component 52 of system 50, as executed by computer system/server 12, is configured to scan, as an image, a physical note positioned on a display screen of an electronic device. In an embodiment, the display screen of the electronic device utilizes organic light-emitting diode (OLED) technology, or any other screen technology that is able to turn off individual pixels without turning off the whole display screen. As illustrated, FIG. 3 shows an individual pixel 300 of an example display screen. Pixel 300 includes screen surface 305, photodiode 310, and screen light-emitting diode (LED) 315. To be scanned, a physical note is positioned on a screen surface 305 of the display screen. The physical note may be held to the screen by a user or "stuck" to the screen (e.g., a sticky-note). In any event, the physical note is positioned on the display screen to produce a scanned image of the note.

Figure 4B:
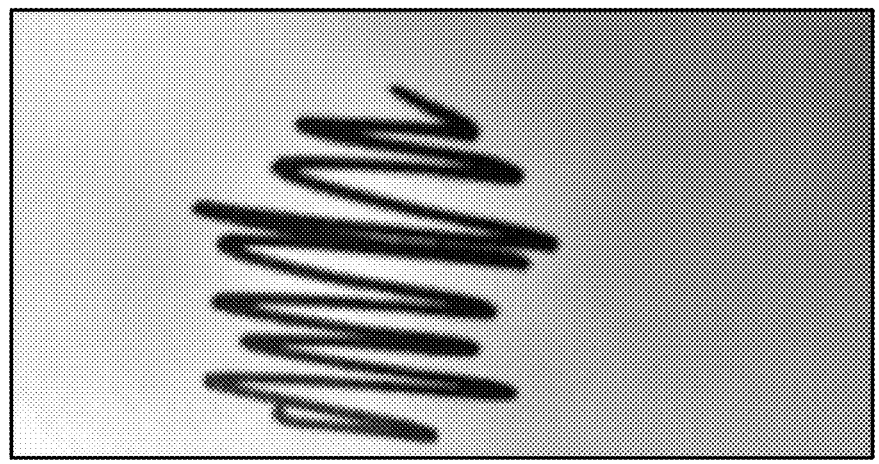
FIGS. 4A-B show an example of an increase of a brightness of specific pixels on a display screen according to an illustrative embodiment of the present invention.
Figure 4A:
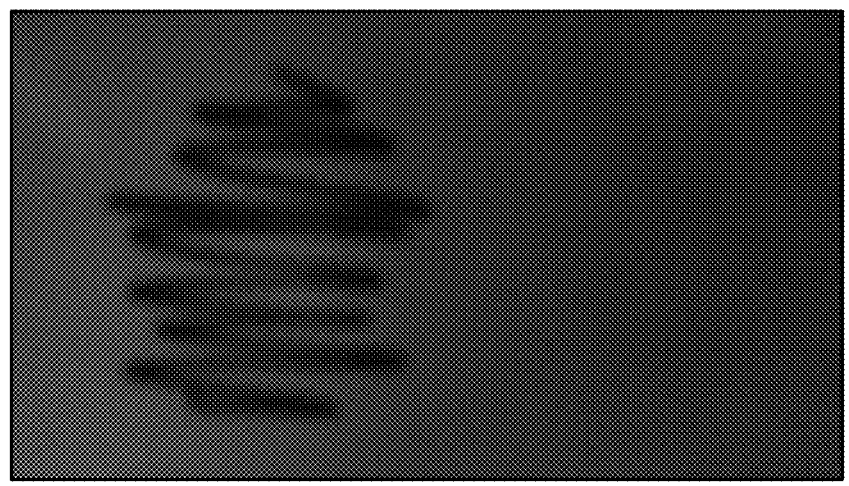

Capture component 52 may increase the brightness of specific pixels within an area associated with the physical note and collect lighting information reflecting from the physical note to construct a scanned image of the note. As shown, LED 315 exists alongside photodiode 310. As a result of this, when a note is detected, capture component 52 will increase a brightness of LED 315 allowing photodiode 310 to record the light reflected back from the note in order to capture a contents of the note. FIGS. 4A-B show an example on how the display screen can increase a brightness of specific pixels to facilitate scanning a physical note placed on the display screen. The process is described in greater detail below.

Prior to scanning, however, capture component 52 must ascertain the area of the display screen to be scanned, either automatically or manually. In an embodiment, capture component 52 may attempt to automatically detect an area where the physical note is placed when the display screen is a resistive touch screen. A resistive touch screen may consist of a number of layers. When the screen is pressed, the outer later is pushed onto the next layer. The technology senses that pressure is being applied and registers input. The input can be used to determine the area of the physical note on the physical screen.

In another embodiment, a calibration process can be performed, regardless of display screen type, to calibrate the display screen to its surroundings in order to measure a difference in a lighting level so that when a physical note is placed on the screen, photodiode 310 can detect any change in light intensity. If there is a change in light intensity (e.g., below or above a predefined threshold) before and after the physical note is positioned on the display screen, then a change in light intensity of surrounding pixels can be checked. If the change is similar or constant, then it can be determined that an object (e.g., a physical note) was placed on the display screen. The scanning process can be performed on those pixels experiencing a change in light intensity. If all of the pixels (or a percentage exceeding a predefined threshold) on the display screen experienced a similar change in light intensity, then it is likely a change occurred in the lighting conditions of the surroundings. In that case, the calibration process can be performed again to measure the new lighting of the surroundings.

In another embodiment, a user may manually provide an area to be scanned when a physical note is held to a display screen. For example, a user can "outline" with her finger the area to be scanned when the display screen is a capacitive touch screen. A capacitive touch screen panel consists of an insulator, such as glass, coated with a transparent conductor, such as indium tin oxide (ITO). As the human body is also an electrical conductor, touching the surface of the screen results in a distortion of the screen's electrostatic field, measurable as a change in capacitance. Different technologies may be used to determine the location of the touch. Capture component 52 may receive the area based on the user's outline. Similarly, a user may use her mouse to outline the area of the display screen related to the note if the display screen is not a touch screen. Likewise, a manual process can be followed for a resistive touch screen if the physical note is not automatically recognized due to poor lighting conditions or poor calibration. In any case, an area associated with the note is determined, either automatically or manually, and the scanning process described below is performed based on the area.

Figure 5:
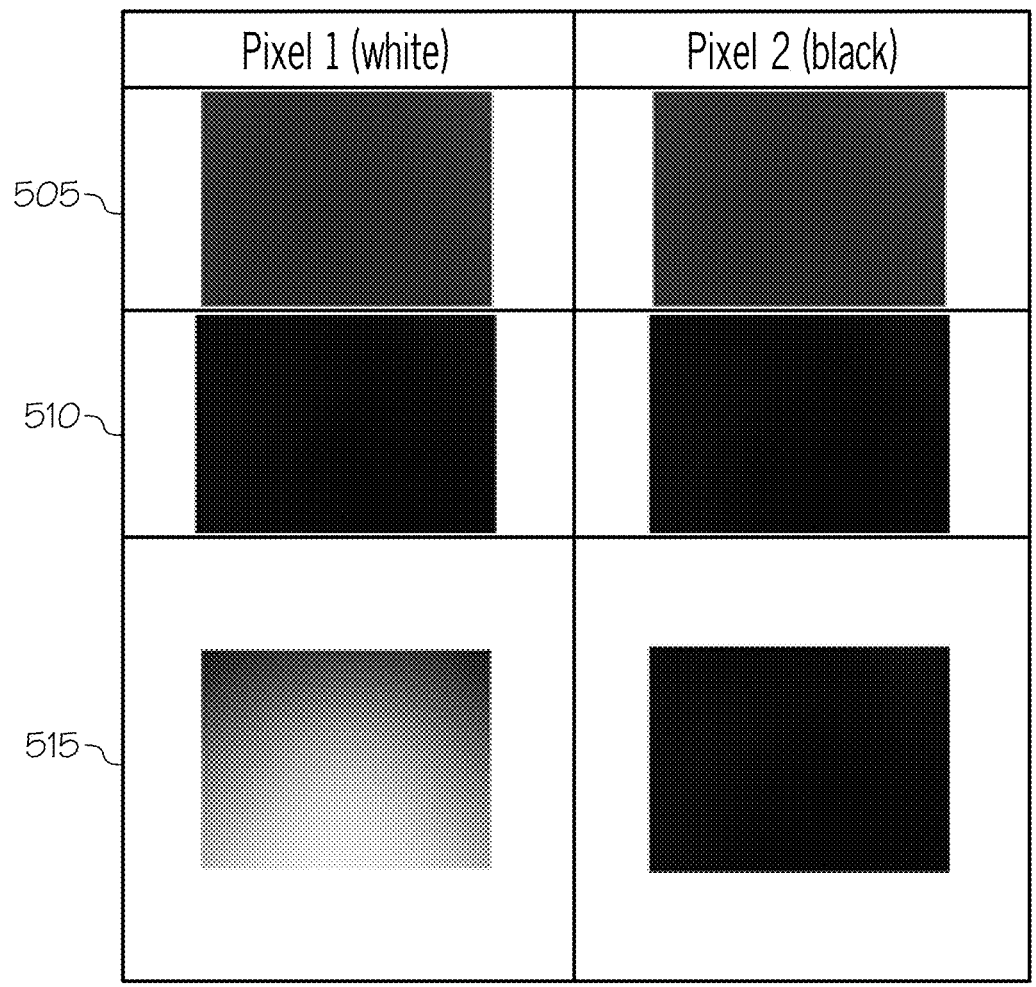
FIG. 5 shows an example color contrast matrix related to two pixels on a display screen according to an illustrative embodiment of the present invention.
Figure 6:
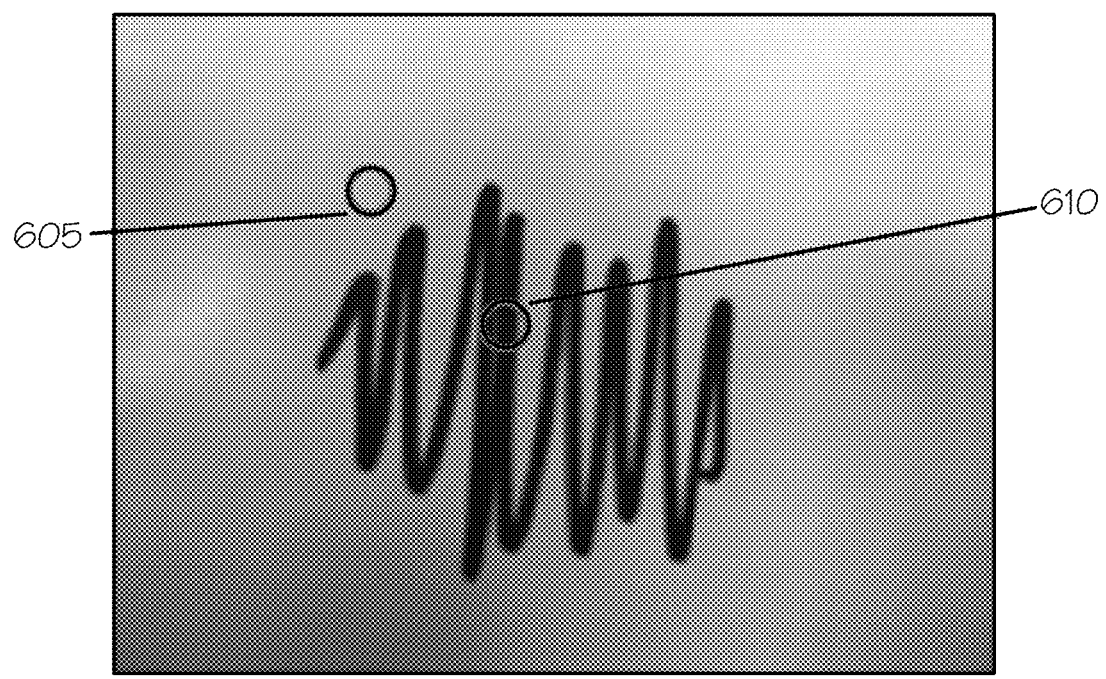
FIG. 6 shows an example scanned image according to an illustrative embodiment of the present invention.

Once the area where the physical note has been placed is determined, the area can be scanned to generate an image of the physical note that has been placed on the display screen. FIG. 5 shows an example color contrast matrix related to two pixels on a display screen (i.e., Pixel 605 and Pixel 610 of FIG. 6). At 505, the two pixels are shown after the calibration process. Both pixels, and all the other pixels on the display screen, detect the same light intensity based on the surroundings. At 510, the two pixels are shown after a physical note is placed on the display screen, covering the two pixels. As shown, the light intensity on these two pixels has changed. The light intensity changes on a subset of pixels where the note has been placed. At 515, the two pixels are shown after the brightness has been increased on the area to be scanned. The results differ based on what has been written or drawn on the physical note as illustrated in FIG. 6. A portion of the physical note is written above Pixel 610, while nothing is written on the note above Pixel 605.

Capture component 52 collects the results from the subset of pixels within the scanning area to generate a scanned image reflecting what has been written and/or drawn on the physical note. This generates an analog signal with a varying voltage (intensity). The converter changes this to a digital signal (0s and 1s). By combining the 0s and 1s for each pixel, a digital black and white image can be built. The scanned image may be generated in any of a set of supported formats, such as JPEG (Joint Photographic Experts Group), tagged image format file (TIFF), bitmap (BMP), graphic image format (GIF), portable network graphics (PNG), or the like. Capture component 52 is further configured to log a set of coordinates of the pixels related to a location of the physical note relative to the display screen. In an embodiment, location data may be stored in a storage system, such as volatile memory.

Application component 54 of system 50, as executed by computer system/server 12, is configured to identify a target application to insert the scanned image. To that end, application component 54 may determine an associated application window that is displayed at the location where the physical note was positioned. To make that determination, application component 54 may be configured to query, or otherwise communicate with, the operating system (OS) of the electronic device to determine an application which is "active" or "at the forefront" at the specific area where the physical note was placed on the display screen. If more than one application is open in the area where the note was placed, then application component 54 can calculate which application is covering the most area, and may select that as the target application.

In an embodiment, application component 54 may prompt a user to select or verify a target application. For example, a pop-up box may be displayed listing each application that the user currently has open. In that case, the user may select the target application to which the scanned image is inserted. In another example, application component 54 may prompt the user to verify the application that application component 54 has deemed the target application is correct. If a verification is not provided by the user, then the scanned image will not be inserted into that particular application.

Presentation component 56 of system 50, as executed by computer system/server 12, is configured to insert the scanned image into a target application. To that end, an application programming interface (API) of the target application to the invention would be needed, or the application would have some level of OS control to simulate the human inserting an image. In an embodiment, the scanned image may be inserted where the user's cursor is currently located. In a first method, presentation component 56 may execute an "insert image" command on the menu bar of the target application. In a second method, presentation component 56 may also insert the image by adding it to the OS clipboard, and then executing a "paste" command on the target application.

In another embodiment, presentation component 56 may insert the image into a target application at a specific location in the application. For example, a user may be working in a word processing application which is taking the entire screen, and the user wants the image to be inserted at a location in the application where she has placed the physical note on the display screen rather than the current cursor location. To facilitate this method, application integration and/or API information being transmitted to the presentation component 56 may be required to allow insertion of the scanned image at a location related to a position of the physical note placed on the display screen, and may vary based on application type. In addition, before pasting a scanned image, presentation component 56 may resize the image so that, when pasted on the target application, it occupies the exact area of space as the area of the application that was covered by the physical note.

Figure 7:
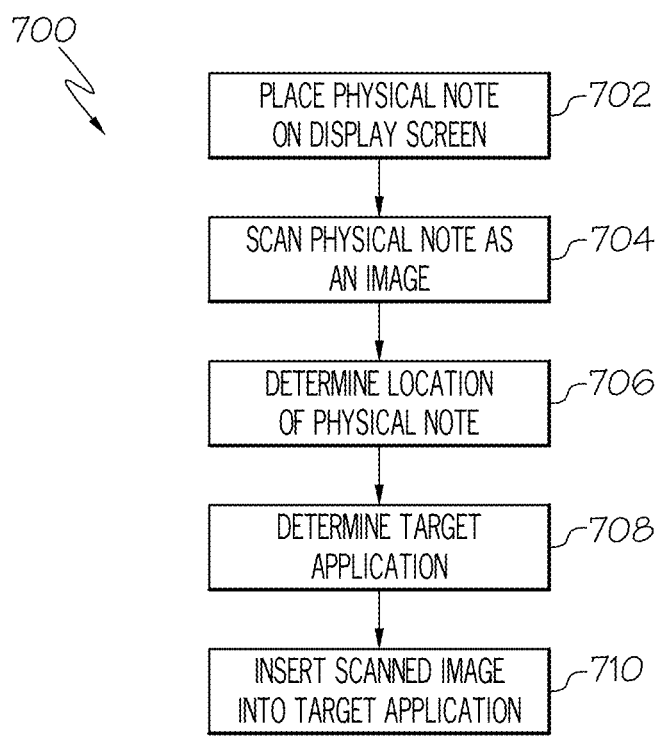
FIG. 7 shows a process flowchart 700 for scanning, as an image, a physical note positioned on a display screen of an electronic device and automatically inserting the scanned image into an application of the electronic device according to an illustrative embodiment of the present invention.

Referring now to FIG. 7, in conjunction with FIG. 2, an implementation of a process flowchart 700 for scanning, as an image, a physical note positioned on a display screen of an electronic device and automatically inserting the scanned image into an application being used on the electronic device is shown. At 702, a user places a physical note on a display screen of an electronic device. At 704, capture component 52 scans, as an image, the physical note placed on the display screen. At 706, capture component 52 further logs a location of the physical note. At 708, application component 54 determines a target application to automatically insert the scanned image based on the location of the physical note. At 710, presentation component 56 inserts the scanned image into the target application.

Process flowchart 700 of FIG. 7 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the Figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices.

For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for scanning, as an image, a physical note positioned on a display screen of an electronic device and automatically inserting the scanned image into an application being used on the electronic device. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for scanning, as an image, a physical note positioned on a display screen of an electronic device and automatically inserting the scanned image into an application being used on the electronic device. In this case, the service provider can create, maintain, support, etc., a computer infrastructure that performs the process steps of the invention for one or more consumers. In return, the service provider can receive payment from the consumer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and routes the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an document of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches for scanning, as an image, a physical note positioned on a display screen of an electronic device and automatically inserting the scanned image into an application being used on the electronic device. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for transferring a physical note to an electronic medium, the method comprising:
scanning as an image, by a set of photodiodes contained in a display screen of an electronic device, a physical note positioned on the display screen;
logging, relative to the display screen, a location at which the physical note is positioned on the display screen;
selecting, from among a plurality of applications being currently displayed on the display screen, a target application into which to insert the scanned image based on the location at which the physical note is positioned on the display screen coinciding with a location of the target application; and
automatically inserting the scanned image into the target application.

2. The method of claim 1, further comprising automatically inserting the scanned image into the target application at a location of a cursor.

3. The method of claim 1, further comprising automatically inserting the scanned image into the target application at a location based on the logged location such that the scanned image is displayed in an exact location on the display screen that the physical note was positioned on the display screen.

4. The method of claim 1, further comprising determining a scanning area related to the physical note.

5. The method of claim 4, further comprising measuring a first lighting level of pixels of the display screen prior to the physical note being positioned; measuring a second lighting level of pixels of the display screen after the physical note is positioned; and automatically defining the scanning area consisting of a subset of all pixels based on a difference between the first and second lighting levels among the measured pixels.

6. The method of claim 4, wherein the scanning area consisting of a subset of pixels of the display screen is manually defined by a user.

7. The method of claim 4, the scanning further comprising increasing a brightness of a set of pixels within the scanning area and collecting lighting information reflected from the physical note to construct the scanned image of the physical note.

8. A computer program product embodied in a computer readable storage medium that, when executed by a computer device, performs a method for transferring a physical note to an electronic medium, the method comprising:
scanning as an image, by a set of photodiodes contained in a display screen of an electronic device, a physical note positioned on the display screen;
logging, relative to the display screen, a location at which the physical note is positioned on the display screen;
selecting, from among a plurality of applications being currently displayed on the display screen, a target application into which to insert the scanned image based on the location at which the physical note is positioned on the display screen coinciding with a location of the target application; and
automatically inserting the scanned image into the target application.

9. The computer program product of claim 8, the method further comprising automatically inserting the scanned image into the target application at a location of a cursor.

10. The computer program product of claim 8, the method further comprising automatically inserting the scanned image into the target application at a location based on the logged location such that the scanned image is displayed in an exact location on the display screen that the physical note was positioned on the display screen.

11. The computer program product of claim 8, the method further comprising determining a scanning area related to the physical note.

12. The computer program product of claim 11, the method further comprising measuring a first lighting level of pixels of the display screen prior to the physical note being positioned; measuring a second lighting level of pixels of the display screen after the physical note is positioned; and automatically defining the scanning area consisting of a subset of all pixels based on a difference between the first and second lighting levels among the measured pixels.

13. The computer program product of claim 11, wherein the scanning area consisting of a subset of pixels of the display screen is manually defined by a user.

14. The computer program product of claim 11, the scanning further comprising increasing a brightness of a set of pixels within the scanning area and collecting lighting information reflected from the physical note to construct the scanned image of the physical note.

15. A system for transferring a physical note to an electronic medium, comprising:
 a display screen having a plurality of pixels, each of the plurality of pixels having a photodiode and a screen light-emitting diode;
 a memory medium comprising instructions;
 a bus coupled to the memory medium; and
 a processor coupled to the bus that when executing the instructions causes the system to perform a method, comprising:
  scanning as an image, by the photodiode of each of the plurality of pixels contained in the display screen that are within an area associated with a physical note, the physical note positioned on the display screen;
  logging, relative to the display screen, a location at which the physical note is positioned on the display screen;
  selecting, from among a plurality of applications being currently displayed on the display screen, a target application into which to insert the scanned image based on the location at which the physical note is positioned on the display screen coinciding with a location of the target application; and
  automatically inserting the scanned image into the target application.

16. The system of claim 15, the method further comprising automatically inserting the scanned image into the target application at a location of a cursor.

17. The system of claim 15, the method further comprising automatically inserting the scanned image into the target application at a location based on the logged location such that the scanned image is displayed in an exact location on the display screen that the physical note was positioned on the display screen.

18. The system of claim 15, the method further comprising determining a scanning area related to the physical note.

19. The system of claim 18, the method further comprising measuring a first lighting level of pixels of the display screen prior to the physical note being positioned; measuring a second lighting level of pixels of the display screen after the physical note is positioned; and automatically defining the scanning area consisting of a subset of all pixels based on a difference between the first and second lighting levels among the measured pixels.

20. The system of claim 18, the scanning further comprising increasing a brightness of a set of pixels from the plurality of pixels that are within the scanning area and collecting lighting information reflected from the physical note to construct the scanned image of the physical note.

* * * * *